United States Patent

Snodgrass

[11] Patent Number: 5,905,765
[45] Date of Patent: May 18, 1999

[54] METHOD OF PROCESSING ERROR-CONTROL CODED, FREQUENCY-HOPPED COMMUNICATION SIGNALS

[75] Inventor: Timothy E. Snodgrass, Palo, Iowa

[73] Assignee: Rockwell International, Costa Mesa, Calif.

[21] Appl. No.: 08/720,105

[22] Filed: Sep. 27, 1996

[51] Int. Cl.$^6$ ............... H03D 1/04; H03D 1/00; H04B 17/00; H04B 15/00

[52] U.S. Cl. ............. 375/346; 375/343; 375/224; 375/208; 375/202

[58] Field of Search ............... 375/346, 343, 375/224, 225, 227, 228, 208, 202, 200, 203

[56] References Cited

U.S. PATENT DOCUMENTS

| | | | |
|---|---|---|---|
| 4,414,676 | 11/1983 | Kraul et al. | 375/368 |
| 5,109,231 | 4/1992 | Olsson | 342/145 |
| 5,144,641 | 9/1992 | Weinberg et al. | 375/228 |
| 5,148,452 | 9/1992 | Kennedy et al. | 375/352 |
| 5,239,555 | 8/1993 | Konig | 375/202 |

*Primary Examiner*—Chi H. Pham
*Assistant Examiner*—Khai Tran
*Attorney, Agent, or Firm*—Kyle Eppele; James P. O'Shaughnessy

[57] ABSTRACT

A system and method of processing wireless signal of data pulses or packets in a communicator system, in which a coded signal is received, synchronized and a histogram of signal parameters is constructed within the receiver at regular intervals. The date in the histogram is then compared to expected values for e given parameter and an appropriate correction factor is generated and utilized in subsequent signal synchronization.

11 Claims, 3 Drawing Sheets

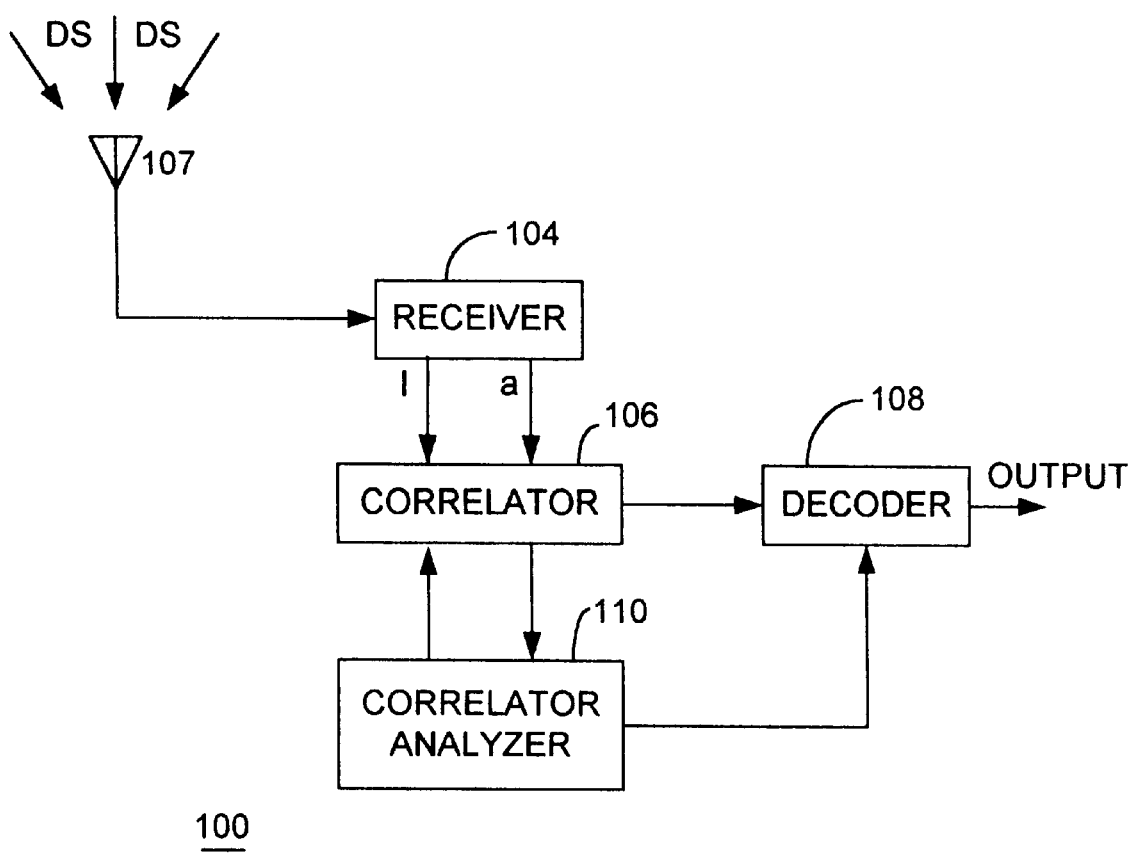

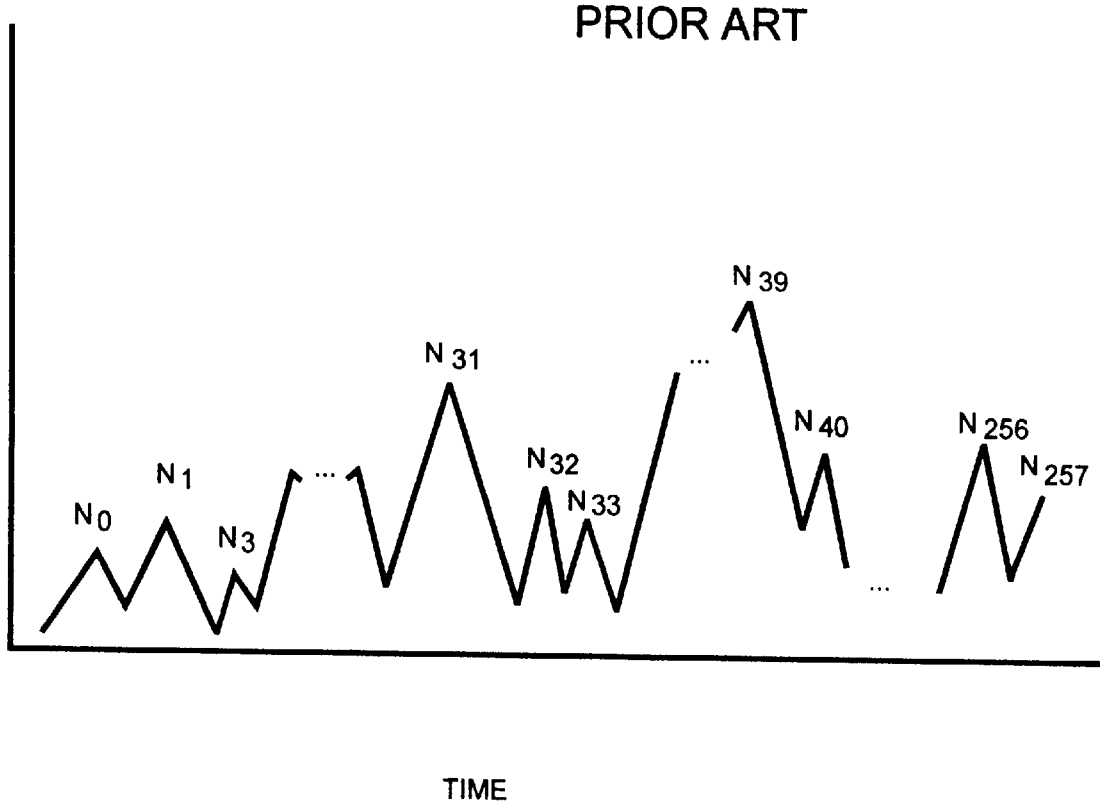

METHOD OF PROCESSING ERROR-CONTROL CODED, FREQUENCY-HOPPED COMMUNICATION SIGNALS

FIELD OF THE INVENTION

The present invention relates generally to digital communications, and more particularly is a method of solving data processing corruption concerns with respect to high speed data transmissions and most particularly with interference or jamming effects on error-control coded, frequency-hopped communication signals.

BACKGROUND OF THE INVENTION

Communication systems are facing a wide variety of system integrity challenges in today's ever advancing electronic world. The rapidly increasing use of wireless communication systems, often co-located with complementary wireless systems provides increased opportunity for signal corruption between intended users. Additionally, in some instances denial of signal reception to unwanted users is highly desirable both in civilian and military settings. In order to accomplish the above goals a mixture of techniques have arisen to ensure accurate signal reception only to desired users.

Among the more prominent transmission schemes for communication systems are systems that implement spread spectrum, frequency hopping and correction code techniques or hybrid systems. Such schemes allow for minimizing the effects of signal interference such as, crosstalk or noise, or alternatively, the effects of intentional signal jamming. In addition it is often desirable to transmit signals in any given region without altering those individuals not intended to receive the transmission.

One example of a system utilizing such technologies is the Joint Tactical Information Distribution System ("JDIDS"). JDIDS is a spread spectrum, time-division-multiple-access system that allows a very large number of designated users to communicate among themselves. A specific waveform having a specified number of pulses with each pulse having a specified number of date bits, has been developed to support JDIDS communications. Additionally, receiver architecture is somewhat standardized generally categorized by total functionality and the physical size of the unit JTIDS users forming a specific network each have a common code sequence that determines the pseudo-noise and frequency-hopping modulation. A JTIDS network is considered "nodsness", and the loss of any one user does not result in a degradation of transmitted information by or to other users. Furthermore, users may transit or receive information to all other users on a given network, thereby forming a virtual information "bus", with respect to the defined network. Thus, the network routinely consists of JTIDS terminals located upon platform that are moving at very high speeds in the case of certain jet aircraft or missile applications, as well as stationary units or unit based upon ships or hand-held.

Prior art methods of processing JTIDS signals was to utilize correlators of various configuration, keyed upon certain data bits in a waveform pulse subsequent to analyzing predetermined data bit positions for the transmitted message. In this manner JTIDS network users were able to synchronize transmitted signals and utilize transmitted information.

To counter the effects of interference, intentional or otherwise, on a given frequency some users resort to utilizing high power transmitters. This brute force type approach can be exceedingly expensive in terms of allocated resources, especially in light of hopped signals and sophisticated interference practices. An alternate approach involves the use of a filter, in continuous operation, to counter the effects of a known interfering signal of relatively narrow bandwidth. This type of interference is typically referred to as excitable interference and is accordingly relatively easy to remove from the desired signal.

A more difficult type of interference to contend with that which varies in duration and frequency, or closely resembles the desired signal, often referred to as non-excises interference. Not only is the identification of such non-excitable interference more complex than existing interference, but the removal, suppression and adaptation to varying parameters is also of increased sophistication.

Accordingly, a new method of processing communication systems signals of a given format that readily identifies non-excitable interference and suppresses or removes such interference is highly desired.

SUMMARY OF THE INVENTION

The present invention is a method for processing an error-control coded, frequency hopped, wireless date signal of a given configuration of N data pulses, that comprises receiving a signal, sampling a given portion of the received signal to establish a high confidence in the accurate processing of the remainder of the signal, constructing a histogram of the processed signal symbols, sorting the processed signal symbols by frequency, scanning the sorted signal symbol values for possible corrupt data, assigning a weighting value to various groups of the sorted signal symbol values and repeating the process after a predetermined decay cycle.

In one embodiment of the present invention a receiver that process the JTIDS waveform, a frequency-hopped, spread spectrum signal that includes error-control coding, is utilized. The JTIDS waveform may be comprised of two hundred and fifty eight pulses that are divided into three groups, a preamble group, a time refinement group, and a data group. A JTIDS receiver of any given class operating on an assigned network receives an individual burst of the two hundred and fifty eight pulses. The block coding of the bits results in a thirty two bit "chip" that is rotated in order to determine the proper symbol. A Reed-Solomon error detection and correction code is utilized that can correct up to X number of errors, or two times X the number of erasures. A histogram of received symbols is constructed in order to identify if the processed signal is subject to corruption in any one or more frequency bands. The information is oversampled in order to gain a high degree of confidence or trend in the data such as shifting due to the Doppler affect on the received signal. By then determining the symbol is corrupted an erasure correction factor is generated, thereby eliminating the need to treat the condition as an error and accordingly improving the through speed and accuracy of the processing of the signal by treating the corruption as en erasure whether then an error.

It is an object of the present Invention to provide a date communication system that has increased accuracy of transmitted messages then prior art communication systems.

It is an auditioned object of the present invention to provide a data communication system that has increased accuracy of transmitted messages than prior art communication systems while retaining the general architecture of the prior at systems.

It is a feature of the present invention to utilize a method of processing transmitted messages in which a portion of the message serves as the basis for determining a processing weighted average value factor.

It is a additional feature of the present invention to determine an accuracy weighting factor by comparing confidence levels of transmitted symbols to the expected values.

It is an advantage of the present invention that wireless communication system messages subject to interference corruption can be accurately processed with no or minimal message corruption.

It is an additional advantage of the present invention that wireless communication system messages subject to interference corruption can be accurately processed with minimal changes to current receiver architecture.

These and other objects, features and advantages are disclosed and claimed in the specification, figures, and claims of the present application.

BRIEF DESCRIPTION OF THE DRAWINGS

FIG. 1 illustrates a communication receiver system incorporating the adaptive weighting function cf the present invention;

FIG. 2 illustrates a two dimensional graph of portions of an exemplar JTIDS message burst, as known in the prior art;

FIG. 3 illustrates data position in serial format for a typical JTIDS chip, as known in the prior art.

DETAILED DESCRIPTION OF THE PREFERRED EMBODIMENTS

Figure 4:
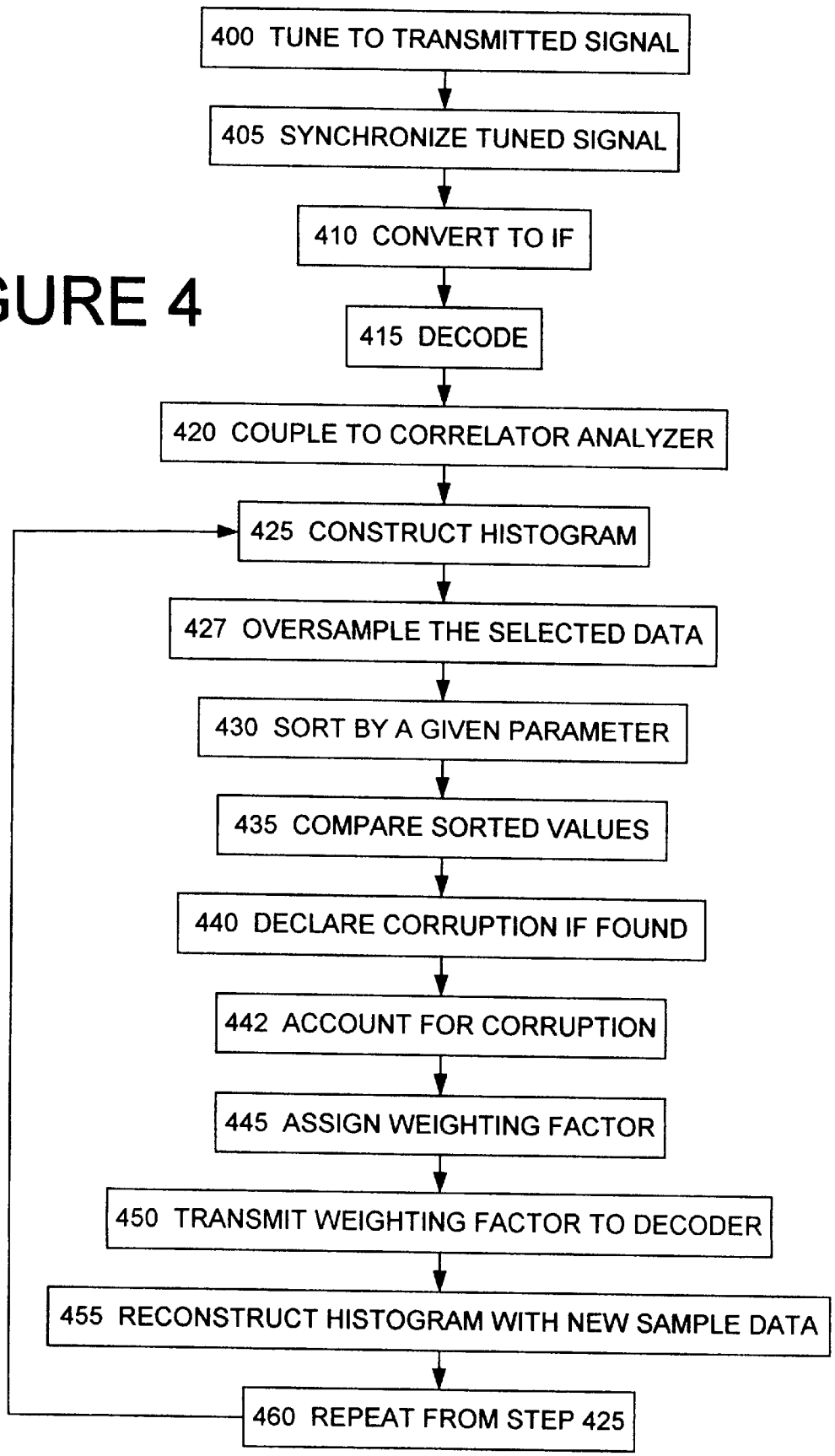
FIG. 4 illustrates a flow-chart of the signal processing method utilized by the system depicted in FIG. 1.

Referring now to the drawings, wherein lake items are referenced as such throughout, FIG. 1 illustrates receiver system 100 that incorporates the teachings of the present invention. As shown, an antenna 102 receives transmitted signals and provides such signals to a receiver 104. The receiver is constructed in accordance with well known architecture, such as superheterodyne multi-channel components and is tuned to receive the desired signal DS, input to it via the antenna 102. In addition to other standard signal processing performed within the receiver 104, the desired signal DS is converted to an intermediate frequency having two components I, an in-phase component and Q, a quadrature phase component. The intermediate frequency signal components I and Q are in turn coupled to a matched filter or correator 106 that derives as its output the maximum possible peak-signal-power to average-noise-power ratio when the input is a known signal.

Since the depicted system 100 utilizes error-correction coding, the output signal of the correator 106 is coupled to a decoder 108. The decoder 108 removes the parity or redundant symbols included in the transmitted signal along with the desired information. The output from the decoder 108 is forwarded to additional processing means (not shown) for storing, outputting or otherwise manipulating the transmitted information. A correlator analyzer 110 is coupled in parallel to each of the correlator 106 and the decoder 108 for providing a correction factor to the decoder 108, with respect to the processed and analyzed signal DS. The correlator analyzer 110 constructs capable of providing a correction signal to the corrector 106, with regard to any detected processing error patterns, or the like.

In operation, the correlator analyzer 110 constructs a histogram of the received, correlated desired signal to determine if any identifiable portion of the signal is corrupt or highly suspect. In evaluating the processed signal, the correlator analyzer may perform a variety of steps, such as oversampling selected portions of the received signal, sorting by hopped frequency, checking portions of the correlated signal or otherwise comparing the received processed signal to predetermined expected norms. Should the correlator analyzer 110 fail to detect any anomaly in the processed signal, then no correction factor is provided to the decoder 108 and the correlator analyzer, merely continues its cycle of loading correlated, received signals at a predetermined rate and analyzing for signal corruption. If however, the results of the correlator analyzer evaluation of the received signal, indicates that portions or periods of the signal are corrupted or highly suspect, then a correction factor is provided to the decoder 108 from the correlator analyzer 110 thereby instructing the decoder to either ignore a portion of the signal or to assign a weighted factor to portions of the signal in order to maximize the accuracy of the received desired information.

In order to better understand the teachings of the present invention, FIG. 2 illustrates a two dimensional graph of portions of an exemplar JTIDS signal burst, as known in the prior art. For the example depicted a JTIDS waveform of two-hundred and fifty eight pulses is shown, although pulse waveforms of seventy-two, or four-hundred and forty four pulses could also be utilized, in addition to alternative waveforms. As shown the preamble section, corresponding to the X waveform pulses of FIG. 1, are represented by pulses $N_0$ through $N_{31}$. The time refinement section, corresponding to the Y waveform pulses of FIG. 1, are represented by pulses $N_{32}$ through $N_{39}$. Finally, the message pulses, corresponding to the Z waveform pulses of FIG. 1, are represented by pulses $N_{39}$ through $N_{257}$.

FIG. 3 illustrates the number and position of a thirty-two bits referred to as "chips", as typically utilized in s JTIDS waveform. Bit positions $B_0$ through $B_{31}$ may be comprised of any combination of data, such as a one or a zero, thereby conveying a relatively small portion of an encoded signal. Each of the thirty-two bits are referred to as a "chip" since they represent only pieces or subparts of a larger information date bit, the remainder information being code bits.

FIG. 4 provides a flow chart illustration of one embodiment of the method utilized in the receiver system 100. The described method is for implementation of the above described system in a receiver that operates within the Joint Tactical Information Display Systems (JTIDS) frequencies and waveforms, although it is understood that the advantages of the described invention are equally applicable to other error-coded communication signals.

The first step in the process, step 400, is to tune the given receiver to the frequency or frequencies of the desired signal in order to receive the intended information. Upon tuning to the desired frequency the receiver must next perform a synchronizing process to ensure that the tuned signal is property analyzed, step 405. Subsequent to the synchronizing of the received signal, a conversion to an intermediate frequency comprising an I signal component and a Q signal component is accomplished, step 410 in the correlator. Upon synchronizing the received signal, the output signal of the correlator is coupled to the input port of the decoder in order to derive the data contained in the coded signal, step 415.

The output of the decoder may then be coupled to various components for storing, viewing or the like. The teachings of the present invention require that in addition to routing the output signal from the correlator to the decoder, that sample results of the correlator output are also coupled to the correlator analyzer, step 420. The correlator analyzer constructs a histogram, or some other reference table, for readily evaluating the sampled output signal values, step 425. The selected data routed to the correlator is oversampled to gain further insight into the nature of any possible anomaly, such as symbol drift due to the Doppler effect on the received signal, step 427.

The correlator analyzer then performs a given function or set of functions, such as sorting by frequency or position, in order to more readily ascertain any detected anomalies, step 430. An analysis of the values in the correlator analyzer is performed, step 435. In this case, the peak to side lobe ratio is compared to predetermined expected values in order to identify potentially corrupt received signals. Should a corrupt or suspect signal be found, the correator analyzer informs the decoder of the condition, step 440. The correlator analyzer may also communicate such condition to the correlator, so that the correlator can take such condition into account in subsequent signal processing, step 442. Commensurate with the evaluation of the signal for possible corruption is the assigning of a correction factor to represent the confidence in the accuracy of various portions of the desired signal. Identification of a suspect signal portion would result in that portion of the signal having a relatively low correction factor assigned to such data. For the case given the decoder would be informed of an erasure condition with respect to such portions of the desired signal, thereby streamlining the processing and improving the accuracy of the processed signal, step 445. Likewise, failure to detect any appreciable normally in the processed signal would simply result in no correction factor being transmitted to the decoder. Alternatively, a correction factor of one or one hundred percent confidence could also be utilized to inform the decoder that the no corruption has been detected. In one of the present invention, an assigned confidence factor in the transmitted signal, based in part upon the presence or absence of a corruption condition, may be inversely proportional to the presence of a corruption condition.

After a predetermined period of time, as determined by the type of corruption that the transmission media is likely to induce, the data in the correlator analyzer is replaced with new samples in order to adapt to changes in the medium, if any, that the desired signal travels, step 460. Upon the receipt of new samples in the correlator analyzer, the above described steps, beginning with constructing a histogram, step 425, are repeated in order to determine updated correction factor values. This reiterative process continues for the duration of operation of the receiver. In this manner the decoder aided in its processing of received signed by receiving an affirmative signal that certain portions of the received signal are known to be corrupted and the additional time and effort of arriving at such conclusion, if possible in the given decoder, is replaced with a streamlined process that instructs the decoder in the desired manner of handling certain portions of the received signal.

while particular embodiments of the present invention have been shown and described, it should be clear that changes and modifications may be made to such embodiments without departing from the true scope and spirit of the invention. It is intended that the appended claims cover all such changes and modifications.

I claim:

1. A method of processing error coded data signals in wireless communication system having bursts of individual date pulses comprising the transmitted signal, comprising the steps of:

receiving a transmitted signal;

performing an initial synchronization of the transmitted signal;

decoding the transmitted signal in accordance with a predetermined decoding scheme;

storing the decoded transmitted signal;

constructing a histogram of the stored decoded transmitted signal;

comparing the histogram with respect to expected values for a selected signal parameter;

informing the system of a corruption condition when stored values so indicate;

assigning a confidence factor in the transmitted signal based, in part upon the presence or absence of a corruption condition;

transmitting the confidence factor to the decoder for subsequent use in processing the transmitted signal;

oversampling a selected portion of the transmitted signal;

reconstructing the histogram with new data samples at predetermined time intervals; and repeating the steps beginning with comparing the histogram values with expected values for a given parameter.

2. The method of claim 1, further including the step of converting the transmitted signal to an intermediate frequency after the step of synchronizing the transmitted signal.

3. The method of claim 1, wherein the parameter for use in the step of comparing stored histogram values to an expected value is the peak-to-side lobe ratio of the transmitted signal.

4. The method of claim 1, wherein the output signal values of the decoder is coupled to a correlator analyzer for construction of the histogram lobe ratio of the transmitted signal.

5. The method of claim 1, wherein the assigned confidence factor in inversely proportional to the presence of a corruption condition.

6. The method of claim 1 wherein the transmitted is signal subject to spread spectrum conditions.

7. The method of claim 1 wherein the transmitted signal is subject to frequency-hopping conditions.

8. The method of claim 7, wherein the histogram is constructed in accordance to symbol values for each frequency.

9. The method of claim 7 wherein the transmitted signal a JTIDS signal waveform.

10. The method of claim 1, wherein the confidence factor is determined by analysis of detection of symbol drift.

11. The method of claim 1, wherein the step of informing the system of detected corruption condition is satisfied by transmitting a confidence factor to the correlator.

* * * * *